H. Herbert,
Wrench.
N°57,506.      Patented Aug. 28, 1866.
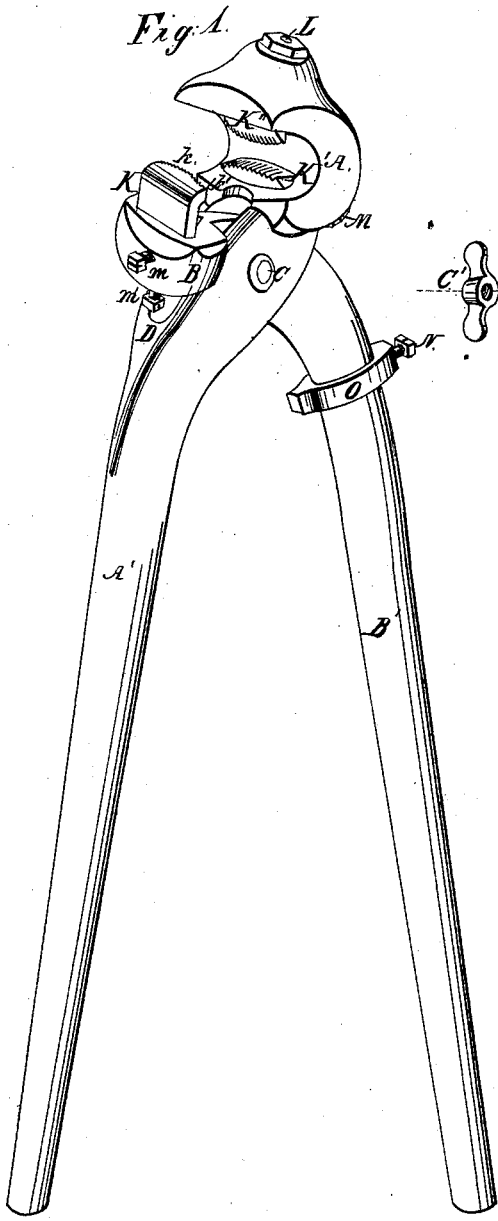
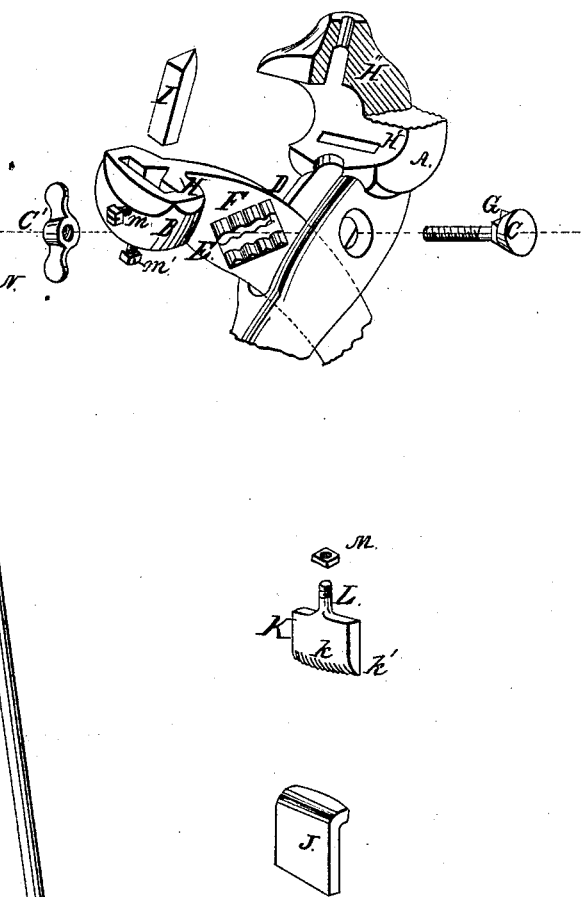
Witnesses:
James H. Layman
F. Millward
Inventor:
H. Herbert
By Knight Bros
Attys

UNITED STATES PATENT OFFICE.

HENRY HERBERT, OF CINCINNATI, OHIO.

IMPROVEMENT IN PIPE-TONGS.

Specification forming part of Letters Patent No. 57,506, dated August 28, 1866.

*To all whom it may concern:*

Be it known that I, HENRY HERBERT, of Cincinnati, Hamilton county, and State of Ohio, have invented a new and useful Improvement in Pipe-Tongs; and I do hereby declare the following to be a full, clear, and exact description thereof, reference being had to the accompanying drawings, making part of this specification.

The object of my invention is to provide for the use of gas-fitters a pair of tongs which shall comprise appliances for the purpose of cutting pipes asunder, chasing screw-threads upon them and screwing them together, and appliances to enable the adjustment of the instrument to suit any given size of pipe or depth of screw-thread.

Figure 1 shows my pipe-tongs as adapted for cutting screws on pipes. Fig. 2 represents the two jaws of the tongs uncoupled and dismantled of their bits.

A B are the jaws, having suitable handles A' B', and coupled to each other by means of a pin, C.

The jaw A has a slot, D, within which the jaw B works.

The jaw B is traversed by a long narrow slot, E, having notches F along its margin to receive teeth G, which project inwardly from the head of the pin C.

The jaw B being adjusted out or in according to the size of the pipe to be operated upon, the pin C is inserted so as to enable the teeth G to enter the particular notches that come opposite to them. The winged nut C' being then screwed home upon the pin C, enables the teeth of the said pin to retain the jaw B to the specific adjustment.

H H' H'' are bit-sockets, of which one socket, H, is of the combined oblong and V form described in my patent of 20th of December, 1864, for the optional insertion either of a circumcising-cutter, I, or of a wrench-bit, J, or of one, K, of a set of screw-cutting bits or dies, K K' K''.

The respective bits are held in place either by the represented screws L and nuts M, or by one or more screws, $m\ m'$.

The dies K K' K'' are channeled on one face, $k$, and left plain on another face, $k'$, the two faces meeting at an acute angle, which, on becoming rounded by use, can be restored to full efficiency and sharpness by the simple grinding or filing of the face $k'$; but as this will at the same time shorten the dies so as to disable their action on a pipe of the same size as heretofore, I have provided a means of correcting the discrepancy, consisting of a slidable stop or gage, O, capable of being set out or in upon the handle B', and fixed by set-screw N to such position as will allow the jaws to close to the precise degree desired.

I do not claim under this application any novelty in the general idea of adapting one implement for the combined purposes of a pipe-tongs, a pipe-cutter, and a screw-cutter, such a tool being covered by my patent of December 20, 1864. Neither do I claim, broadly, an adjustable gage for regulating the screw-dies, a gage for a similar purpose being seen in my aforesaid patent, and one for an analogous purpose in L. Brooks's patent of March 29, 1859.

What I claim as my invention, and desire to secure by Letters Patent, is—

1. The adjustable pipe-tongs constructed with a toothed pin, C G, substantially as and for the purposes set forth.

2. The adjustable gage consisting of the sliding collar O and set-screw N, when constructed and arranged to operate as and for the purposes specified.

In testimony of which invention I hereunto set my hand.

HENRY HERBERT.

Witnesses:
GEO. H. KNIGHT,
JAMES H. LAYMAN.